US009137562B2

(12) United States Patent
Schmouker et al.

(10) Patent No.: US 9,137,562 B2
(45) Date of Patent: Sep. 15, 2015

(54) METHOD OF VIEWING AUDIOVISUAL DOCUMENTS ON A RECEIVER, AND RECEIVER FOR VIEWING SUCH DOCUMENTS

(75) Inventors: Philippe Schmouker, Betton (FR); Lionel Oisel, Pleumeleuc (FR); Denis Mischler, Thorigne Fouillard (FR)

(73) Assignee: THOMSON LICENSING, Boulogne-Billancourt (FR)

( * ) Notice: Subject to any disclaimer, the term of this patent is extended or adjusted under 35 U.S.C. 154(b) by 2023 days.

(21) Appl. No.: 11/225,246

(22) Filed: Sep. 13, 2005

(65) Prior Publication Data
US 2006/0061602 A1    Mar. 23, 2006

(30) Foreign Application Priority Data

Sep. 17, 2004   (FR) ..................................... 04 52076

(51) Int. Cl.
| | |
|---|---|
| G09G 5/00 | (2006.01) |
| H04N 21/435 | (2011.01) |
| G11B 27/10 | (2006.01) |
| H04N 5/44 | (2011.01) |
| H04N 21/235 | (2011.01) |
| H04N 21/472 | (2011.01) |
| H04N 21/4728 | (2011.01) |
| H04N 21/485 | (2011.01) |
| H04N 21/47 | (2011.01) |

(52) U.S. Cl.
CPC ............ *H04N 21/435* (2013.01); *G11B 27/105* (2013.01); *H04N 5/44* (2013.01); *H04N 21/235* (2013.01); *H04N 21/4728* (2013.01); *H04N 21/47205* (2013.01); *H04N 21/4858* (2013.01); *H04N 21/47* (2013.01)

(58) Field of Classification Search
USPC .......................................................... 345/660
See application file for complete search history.

(56) References Cited

U.S. PATENT DOCUMENTS

| | | | |
|---|---|---|---|
| 6,535,639 B1 * | 3/2003 | Uchihachi et al. ............ 382/225 |
| 7,432,983 B2 | 10/2008 | Masukura et al. | |
| 7,852,414 B2 | 12/2010 | Kijak | |
| 2002/0030699 A1 | 3/2002 | Van Ee | |
| 2002/0164149 A1 * | 11/2002 | Wilkinson ...................... 386/46 |

(Continued)

FOREIGN PATENT DOCUMENTS

| | | |
|---|---|---|
| CN | 1517952 | 8/2004 |
| EP | 0938062 A2 | 8/1999 |

(Continued)

OTHER PUBLICATIONS

Fan et al., Looking into video frames on small displays, Proceedings of the 11th ACM international conference on multimedia, CA, pp. 247-250, 2003.

*Primary Examiner* — M Good Johnson
(74) *Attorney, Agent, or Firm* — Vincent E. Duffy; Joel M. Fogelson

(57) ABSTRACT

The invention discloses a method of viewing audiovisual documents on a playback device, comprising a step for reading or receiving a document and a display step for viewing the images of this document on a screen. The method further comprises a step for reading or receiving an attribute associated with a time band of the document. A predetermined value of the attribute triggers on the device the enlargement of a part of the image on playback during said time band, because of which this image part occupies a larger area on screen.

21 Claims, 5 Drawing Sheets

(56) References Cited

U.S. PATENT DOCUMENTS

| | | |
|---|---|---|
| 2003/0002715 A1* | 1/2003 | Kowald ................. 382/118 |
| 2003/0077002 A1 | 4/2003 | Silverstein et al. |
| 2003/0103065 A1* | 6/2003 | Masera et al. ........... 345/660 |
| 2003/0113096 A1* | 6/2003 | Taira et al. ............. 386/46 |
| 2003/0194211 A1 | 10/2003 | Abecassis |
| 2004/0078805 A1* | 4/2004 | Brian et al. ............. 725/1 |
| 2004/0105654 A1 | 6/2004 | Ozawa et al. |
| 2004/0117257 A1* | 6/2004 | Haberman et al. ......... 705/14 |
| 2004/0127201 A1 | 7/2004 | Takayama et al. |
| 2004/0145670 A1 | 7/2004 | Hong |
| 2004/0148640 A1 | 7/2004 | Masukura et al. |
| 2005/0083350 A1* | 4/2005 | Battles ................. 345/660 |
| 2005/0163218 A1 | 7/2005 | Le Clerc et al. |

FOREIGN PATENT DOCUMENTS

| | | |
|---|---|---|
| EP | 1100268 | 5/2001 |
| EP | 1351197 | 10/2003 |
| EP | 1589478 | 10/2005 |
| FR | 2833797 | 6/2003 |
| JP | 09130659 | 5/1997 |
| JP | 11346343 | 12/1999 |
| JP | 2001346140 | 12/2001 |
| JP | 2003108979 | 4/2003 |
| JP | 2003339003 | 11/2003 |
| JP | 2004140670 | 5/2004 |
| JP | 2004172671 | 6/2004 |
| WO | WO2004/040472 | 5/2004 |
| WO | WO2004051656 | 6/2004 |
| WO | WO2004063973 | 7/2004 |

* cited by examiner

METHOD OF VIEWING AUDIOVISUAL DOCUMENTS ON A RECEIVER, AND RECEIVER FOR VIEWING SUCH DOCUMENTS

This application claims the benefit, under 35 U.S.C. 119, of French patent application No. 0452076 filed 17 Sep. 2004.

FIELD OF THE INVENTION

The invention relates to a method of viewing audiovisual documents on a receiver, and a receiver for viewing such documents. The invention more specifically relates to the processing of the document display.

BACKGROUND

These days a user can download an audiovisual document from a broadcaster to view it on his playback device. More recently, new miniaturized devices for playing back audiovisual transmissions have appeared on the market. Thus, personal digital assistants (PDAs) or even mobile telephones with color graphics screens, are provided with programs and memories for storing audiovisual documents, such as films, documentaries, sporting events, and so on. When the part of interest to a user concerns a small part of the image, the miniaturization of the screen makes it difficult for the user to follow the event.

Associating attributes with the image signals, whether digital or analogue, is widely practiced; these attributes typically concern the title, theme or even the display format. For example, the DVB-SI specification (Digital Video Broadcast—specification for Service Information) EN 300 468 V1.3.1 (published by the ETSI) specifies the attribute function and format associated with audiovisual documents. For example, an attribute specifies whether the video signals of the document are of 4/3 or 16/9 type. The playback device takes account of this attribute and adapts the display according to its value, which makes it possible to make maximum use of the screen area by distorting the image. However, in the case of devices with miniaturized screens, adapting the display to the screen size does not always make it possible to follow the event in satisfactory conditions.

The document U.S. 2004/148640—MASUKURA teaches a device for receiving from a network and playing back an audiovisual document on a screen. Attributes, called "Metadata", are received from the network in association with the document, this metadata defining regions of the image that are to be enlarged so that they can be viewed more comfortably by the user. The transmission of such information occupies bandwidth and obliges the broadcaster to apply processing prior to transmission.

SUMMARY OF THE INVENTION

The invention proposes a method of viewing an audiovisual document on a playback device provided with a display means, comprising a display step for viewing at normal size the images of this document on said display means; wherein it comprises on a playback device a step for determining an area of at least one image of said document according to the content of the image, and a step for enlarging said image area to view during a time band said area with a larger size on the screen than in the image at normal size.

In this way, the user can easily view actions of interest, even on a small screen. Furthermore, the playback device itself determines the characteristics of the area to be enlarged according to the content of the image. In this way, the display is customized for each receiving device. According to a first improvement, the device determines the geometric characteristics of the area to be enlarged. According to another improvement, the device itself determines the enlargement ratio of the area according to the characteristics of the display means, a mobile telephone screen for example. In this way, the area to be enlarged is tailored to the device. According to another improvement, the image is analyzed to determine the position of one or more particular objects, a ball surrounded by a number of players, for example. The duly delimited area around said object will then be enlarged.

According to another improvement, enlargement values are recomputed at regular intervals, during document playback time bands. During a time band, the enlargement step is triggered according to the associated value. In this way, the device adapts the visual content to be enlarged as the document is played back.

According to an improvement, the enlargement concerns only a part of the image appearing on the screen with a magnifying-glass effect. The user thus sees that a part of the image is enlarged, and can position it within the normal image.

The invention also proposes a device for viewing audiovisual documents comprising a display means for viewing whole images of this document on a screen; wherein it further comprises a means of determining an area of at least one image of said document according to the content of the image, and an enlargement means for viewing, during a time band, said area with a larger size than in the image at normal size.

BRIEF DESCRIPTION OF THE DRAWINGS

The present invention will now become apparent with greater detail from the description that follows of embodiments given for illustrative purposes and with reference to the appended figures in which.

DETAILED DESCRIPTION

Figure 1:
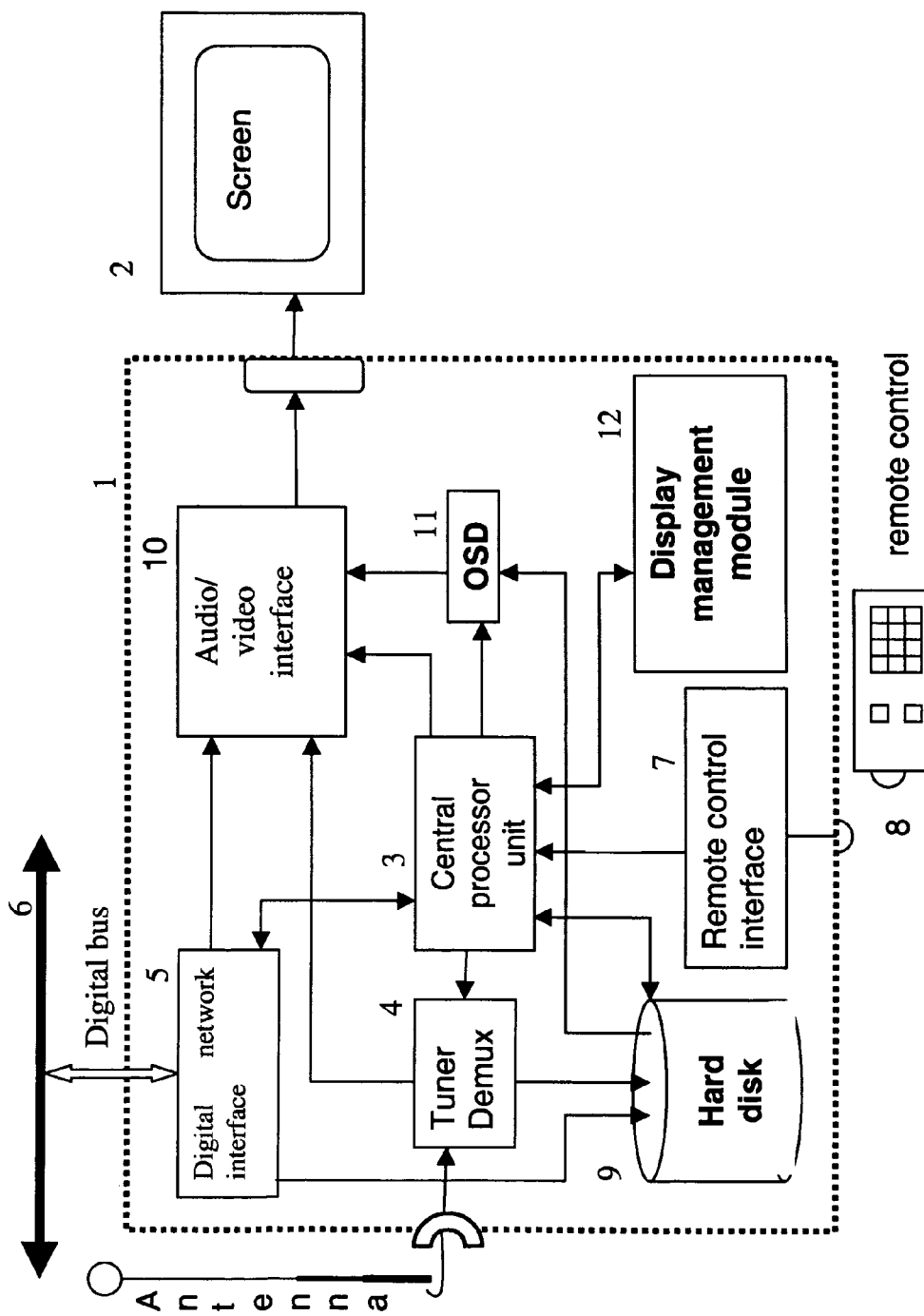
FIG. 1 is a block diagram of an audiovisual receiver for implementing the invention.

The operation of an audiovisual playback device 1 provided with a display device 2 is described first with the help of FIG. 1. This device is, for example, a set-top box, a personal computer, a PDA or a mobile telephone device. In the last two examples, the display device 2 and the device are incorporated in the same device. The preferred example described in the rest of the document concerns a set-top box linked to a viewing screen. The device 1 includes a central processor unit 3 linked to a program and working memory 12 (ROM and RAM respectively), and an interface 5 for communication with a local high speed digital bus 6 used to transmit audio/video data in real time. This network is, for example, an IEEE 1394 network. This digital bus is also used to send data to a server. The device 1 can also receive audio/video data from a transmission network via a receive antenna associated with a demodulator 4. The device 1 further comprises an infrared signal receiver 7 for receiving signals from a remote control 8, a storage means 9 for storing audiovisual documents, and an audio/video decoding logic 10 for generating the audiovisual signals sent to the television screen 2. If the audiovisual transmissions are digital, the storage means 9 is preferably a hard disk (HDD), but it can also be a video recorder reading magnetic tapes or a recordable optical disk reader/recorder (DVD-RAM).

The device 1 also has a clock (not shown) for calculating the viewing time of a document.

The device 1 also comprises a circuit 11 for displaying data on the screen, often called on-screen display (OSD) circuit. The OSD circuit 11 is a text and graphics generator which is used to display on screen menus, pictograms (for example, a number corresponding to the channel being viewed), or which can be used to mix two audiovisual contents and, if necessary, enlarge one of them. The OSD circuit is mainly controlled by the central processor unit 3 associated with an executable module called a "Display Management Module" (DMM). The DMM module typically comprises a program module resident in read-only memory 12 and parameters stored in working memory. The DMM module can also be produced in the form of a custom circuit, of ASIC type for example.

The audiovisual documents transmitted in digital form are transmitted in packets referenced and stored in the memory 9. Some packets contain images and sound and others contain attributes of the audiovisual document. According to an exemplary embodiment, the documents have an attribute, the value of which specifies a particular type of view. According to a simplified embodiment, the recognized types envisaged for the time being are:

Long shot
Close-up.

Most of the image of a close-up is presumed to contain the interesting part, for example, the camera zooms in on two football players during a match. Whereas in a long shot, for example, when all of the pitch of the stadium is filmed, only a small part—the vicinity of the ball—is actually of interest to the user. According to the method that is the subject of the present invention, the attribute indicating the type of shot, sometimes called "metadata", defines the type of video display required on certain types of viewing device. More specifically, the attribute indicates whether the image (or a part) viewed on certain screens should or should not be enlarged.

According to a particularly simple exemplary embodiment, the value of the attribute is updated at camera level. The long shot or close-up adjustment made by the cameraman determines the value of the attribute. This simplified mode does not preclude the possibility of the attribute being updated after the shots have been taken by the broadcaster himself. Thus, the attribute is associated with the transmitted document. For a direct broadcast, the attribute is sent via a dedicated channel in an MPEG-2 stream, the channel corresponding to a header (or PID) linked to the complete program in the program tables. Finally, the attribute can be determined by analysis of the image in the playback device 1.

Depending on the value of the attribute, the viewing device automatically selects a display mode: either the image appears full screen, or the image is enlarged to display only the interesting part. The table below summarizes the various cases that can arise:

| Device type/Shot type | Widescreen device | Small screen device |
| --- | --- | --- |
| Long shot | Video retained | Video enlarged |
| Close-up | Video retained | Video retained |

If the video is retained, the images received are not modified on display, in other words: the entire image appears on the screen. If the screen of the display device 2 is of large size, a television, plasma or LCD screen, or even the image produced by a video projector, there is no need to enlarge any part of the image, because even a small part appears legible enough.

For long shots, only the devices designed to display conventional videos can display legible information. In the case of small displays, an enlargement of the images or a part of the latter is necessary to make the images legible. For example: on a long shot, each player in a football match or rugby match occupies a small area of the images, and the ball is even smaller. A mobile telephone has to apply subsampling of the pixels for each image in order to display the latter on its small screen, so there is a risk of the ball disappearing and therefore adversely affecting the understanding of the event.

Figure 2:
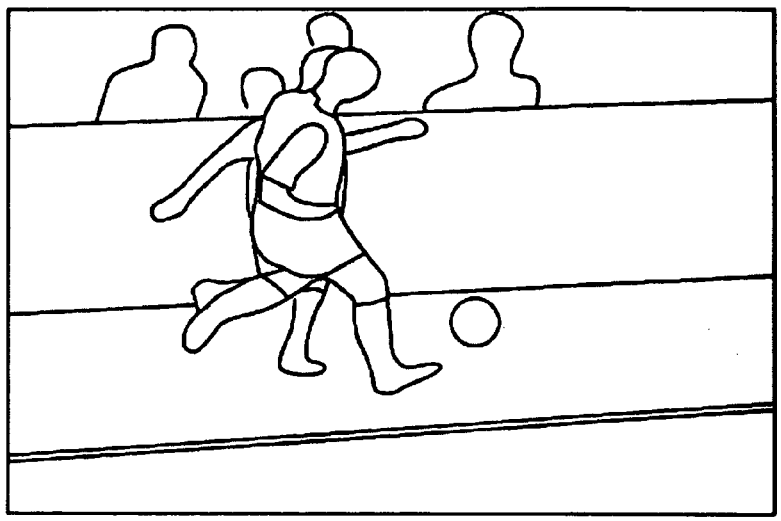
FIG. 2 is an example of image taken in close-up.
Figure 3:
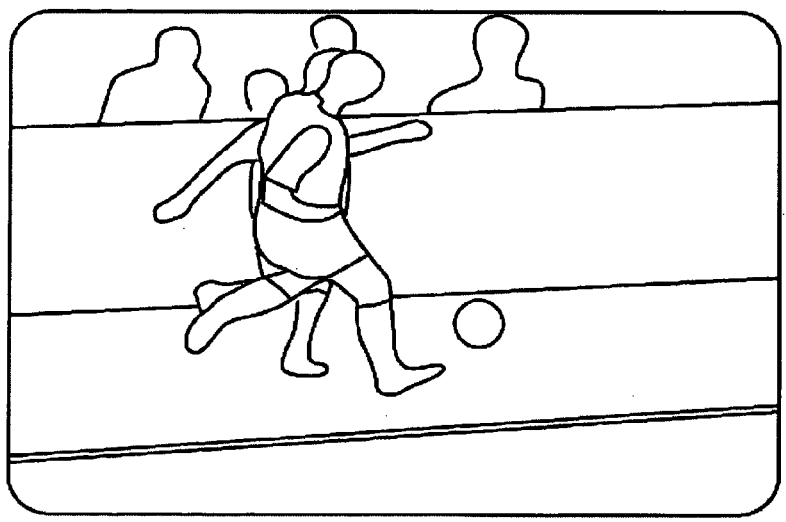
FIG. 3 is the appearance of the image displayed by a large screen with the close-up of FIG. 2.
Figure 4:
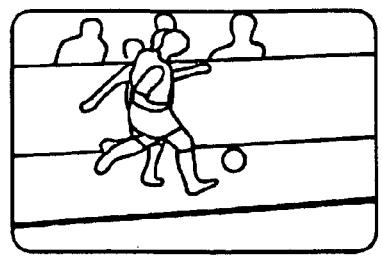
FIG. 4 is the appearance of the image displayed by a small screen, with the close-up of FIG. 2.

In the figures and examples that follow, a football match is used as a document, but, obviously, any audiovisual document can be applied to the present invention: tennis matches, documentaries, films, etc. FIG. 2 is an example of an image taken in close-up. It contains two players around a football. FIG. 3 shows how the close-up of FIG. 2 appears when displayed by a large screen. The players appear clearly. FIG. 4 shows how the close-up of FIG. 2 appears when displayed on a small screen. The players again appear clearly, and the user can follow their action. Advantageously, the device can use an anti-aliasing filter. Such a filter, applied either to all of the image displayed, or only to the contours detected in the image, is used to smooth or soften strong transitions.

Figure 5:
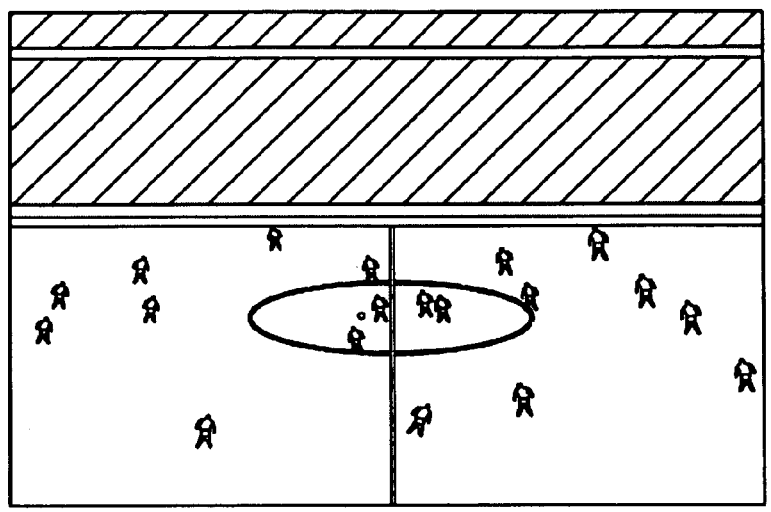
FIG. 5 is an example of image taken in long shot.
Figure 6:
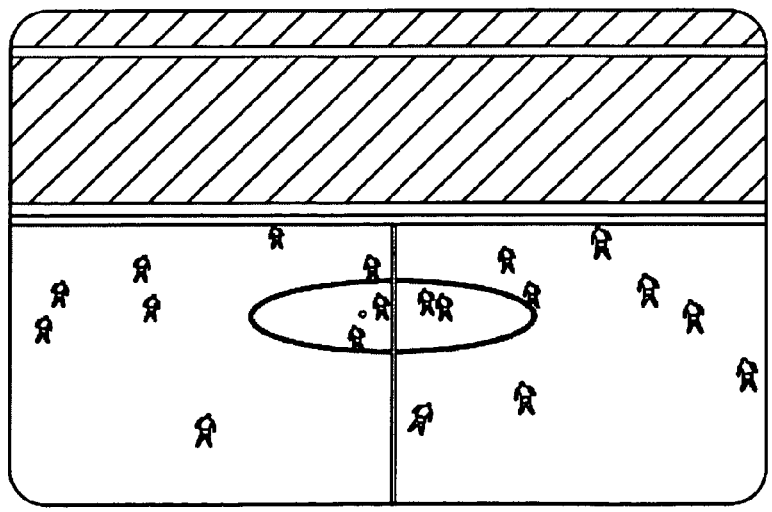
FIG. 6 is the appearance of the image displayed by a large screen, with the long shot of FIG. 5.
Figure 7:
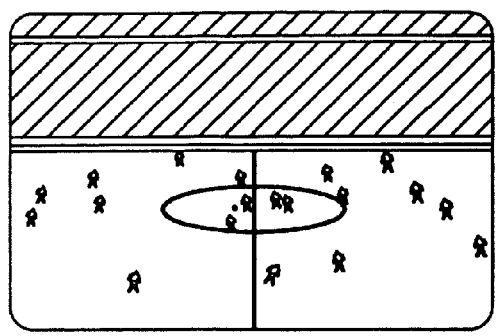
FIG. 7 is the appearance of the image displayed by a small screen, with the long shot of FIG. 5.
Figure 8:
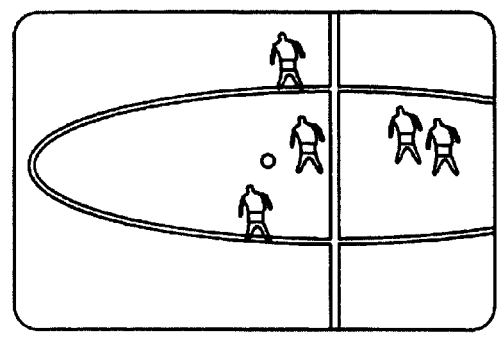
FIG. 8 is the appearance of the image displayed by a small screen with the long shot of FIG. 2, using the method of the invention.

FIG. 5 is an example of image taken in long shot. Fifteen or so players are moving on a football pitch, and the football can be distinguished in the middle of the screen. FIG. 6 shows how the long shot of FIG. 5 appears when displayed on a large screen. The user can distinguish the players and the football without problems. FIG. 7 shows how the long shot of FIG. 5 appears when displayed on a small screen. The user can now almost not make out the players and can no longer follow the ball since it is so small on the display. The method that is the subject of the present invention will, if necessary, enlarge the image according to the type of playback device so that the image displayed is again of interest to the user. FIG. 8 shows how the long shot of FIG. 5 appears when displayed by a small screen after processing by the DMM module. The image displayed concerns only the action in the middle of the pitch, and four players can easily be seen and the football can be distinguished.

There now follows a description of how the playback device provided with reduced display capability selects the part of the image to be enlarged.

According to a preferred and particularly simple embodiment of the present invention, it can be considered that the interesting part of the action is located in the middle of the image. Because of this, when the attribute indicates that the shot is long, the DMM module sends a command to the OSD circuit 11, consisting in enlarging the central part of the image. According to an improvement, the attribute transmitted and/or read specifies the enlargement value of the interesting area. As a variant of this improvement, this value is defined by the user during a parameter programming step. For example, the user displays a programming submenu and enters the enlargement value with his remote control 8, or any other command entry means, whether incorporated or not in the device 1.

According to an improvement, the value of the attribute varies according to the image displayed, and therefore while the document is being played back. For example, to return to the example of a football match, the image sometimes concerns long shots of the pitch and sometimes close-ups on the players. Because of this, the attribute comprises a series of data pairings; the first data item specifies a time band of the document and the second is the value of the attribute during this time window. The time window is based from the start of the document. The clock of the playback device is used to provide the time reference. The table below illustrates the shot breakdown of a document, each shot having its own attribute value:

| Shot number | Time band | Attribute value |
|---|---|---|
| 1 | 0 h 00'00"-0 h 01'23" | L |
| 2 | 0 h 01'24"-0 h 01'53" | C |
| 3 | 0 h 01'54"-0 h 03'11" | L |
| 4 | 0 h 03'12"-0 h 01'45" | C |

In which "L" indicates that the shot is long and "C" that the shot is close-up.

If the invention is used for a direct transmission of an event, the first data item specifies only the starting value of the time band, associated with the value of the L or C attribute. This value will remain valid until the start of the next band, when the attribute value changes.

The above table then becomes:

| Shot number | Time band | Attribute value |
|---|---|---|
| 1 | 0 h 00'00" | L |
| 2 | 0 h 01'24" | C |
| 3 | 0 h 01'54" | L |
| 4 | 0 h 03'12" | C |

If the attribute can take only two mutually exclusive values (for example, when only the long and close-up shots are detected and used), the transmission of the starting values of the time bands is enough provided that the first attribute value for the first band has been communicated.

The above table then becomes:

| Shot number | Time band | Attribute value |
|---|---|---|
| 1 | 0 h 00'00" | L |
| 2 | 0 h 01'24" | |
| 3 | 0 h 01'54" | |
| 4 | 0 h 03'12" | |

According to another improvement, the interesting part of the screen is specified in another field of the attribute. This part is a rectangle and the duly delimited interesting area is characterized by the centre of the rectangle. The device 1 computes the sampling in order to determine the final image viewed about this central point and therefore the enlargement applied to the interesting area.

This improvement can easily be combined with the preceding one, such that the table defining the attribute is enhanced as follows:

| Shot number | Time band | Attribute value | Centre of interesting area |
|---|---|---|---|
| 1 | 0 h 00'00" | L | $(x_1, Y_1)$ |
| 2 | 0 h 01'24" | C | $(x_2, Y_2)$ |
| 3 | 0 h 01'54" | L | $(x_3, Y_3)$ |
| 4 | 0 h 03'12" | C | $(x_4, Y_4)$ |

The data in the table can be transmitted and stored in the form of metadata directly associated with the stream in an MXF schema. According to an improvement, the attribute contains, for each time band, a set of pairs associating a point of the image defining the centre of the interesting area and a topic, a theme for example, or a subject. This is used to differentiate certain parts of the image according to their topic. For example, when transmitting a cycle race, one and the same image can show the leading rider the following pack, the surrounding landscapes and so on. A user may want to view only one of these image portions in enlarged format. For this, the device compares a keyword entered by the user (for example: "first", "pack", "environment"), and compares it with the key word or words associated with a data set. If the words correspond (either literally, or because they are synonymous), then the image corresponding to this key word is enlarged.

Figure 9:
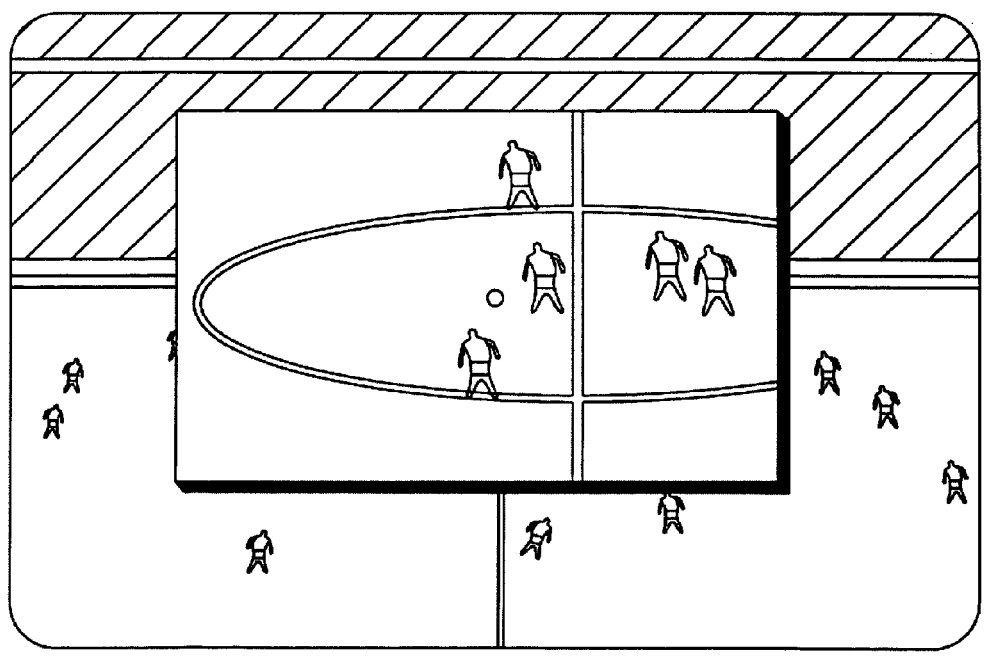
FIG. 9 is an image displayed on a screen in which the central part has been enlarged and framed.

According to an embodiment variant, the DMM module controls the OSD so that a part of the image played back is enlarged. The image then comprises an enlarged part containing the most interesting part of the audiovisual document, the part of the image surrounding this enlarged part remaining at a normal size. This variant can be used when the attribute specifies an interesting area and a value for enlarging this area, and, once enlarged, this area occupies only a part of the screen. Advantageously, the video of the frame surrounding the enlarged part is distorted to reinforce the fact that the enlarged image appears with a magnifying-glass effect. FIG. 9 shows a composite image in which the central part has been enlarged and framed.

The size of interesting area around the point specified in the attribute can be entered manually using a menu and remote control buttons. This user interface is incorporated in the DMM module According to another variant, the characteristics of the interesting part of the image (position, size) are determined by the playback device 1, by using an image recognition engine. For example, in a football match, the action is always located around the football. The image recognition engine analyses the video data and searches for a moving object having the visual characteristics of a football. The engine generates a video area in which the football is at the centre and communicates this area to the DMM module which is responsible for enlarging it as appropriate. Such an engine can be used to analyze all sporting documents in which the players use an object as the stake of the game (football, rugby ball, tennis ball, etc.).

Another way of determining an interesting area within the playback device involves analyzing the activity of the elements of the image; in practice, the content of this area normally contains a more important activity than the rest of the image. This activity measurement is based on a prior measurement of the movement of the camera between the current image and the preceding one. Then, the movement between each pixel of the current image and each pixel of the preceding image is computed by subtracting the movement characteristic linked to the movement of the camera computed previously. The result is then, for each pixel, the value of the intrinsic movement of the object. The barycentre of each pixel is taken as the centre of the area of interest.

According to this variant, the DMM module determines the area to be enlarged during predetermined time bands. Determination can be performed at regular intervals, every second, for example, so defining the duration of the time band. In this way, the device constantly determines whether the image received contains an area that requires enlargement taking Into account the display means and, where appropriate, parameters entered by the user. Another method consists in detecting breaks between the sequences and running a step for determining the area to be enlarged only at the time of the breaks. In practice, when the shot is close-up, there is no a priori need to enlarge the image, but when the image appears in long shot, it is necessary to determine whether an enlargement is necessary for a good legibility on the display means.

Figure 10:
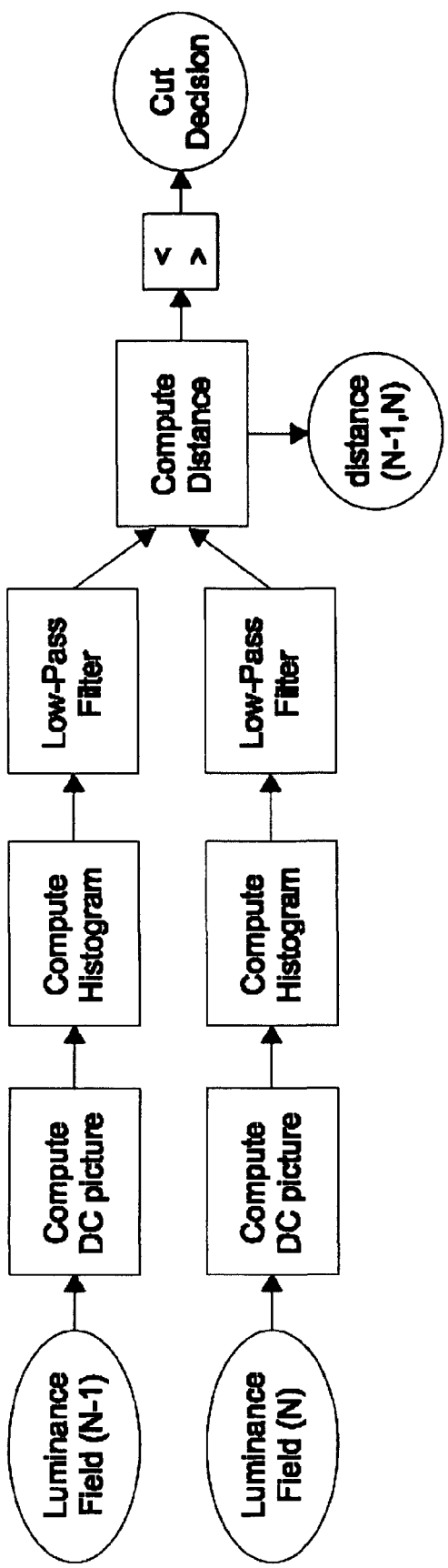
FIG. 10 is an example of flow diagram of a program for generating image shots and attribute values associated with these shots.

In a more sophisticated way, the DMM module incorporated in the playback device contains a program represented by the flow diagram illustrated in FIG. 10. This program constitutes a method of generating shots and attributes values associated with these shots. The first step of this program consists in a pre-processing to divide the video into shots, a shot being characterized by a shot unit. A luminance histogram is computed from a subsampled version of each image of the video sequence. For interleaved video, each frame is processed in turn. For compressed video, the low-resolution images are obtained directly from the DC (direct current) coefficients that can originate, for example, from a DCT (direct cosine transform) breakdown. The histograms are then filtered by a low-resolution filter with finite impulse response. The distance between histograms used is defined as the accumulation of the differences from class to class. This distance is computed on successive images or frames. A shot break is then detected when the distance defined previously is greater than a given threshold.

The second step of the flow diagram of FIG. 10 consists in extracting the attribute values (close-up shot or long shot) of each part of the duly broken down document. For this, the DMM module extracts the following characteristics:
- the average number of pixels in the shot associated with the dominant color in the sequence,
- the average activity in the shot,
- the movement of the camera.

The first characteristic requires the prior computation of the dominant color in the sequence. The objective is to obtain the values in the RGB color space (or other: HSV, HLS, etc.) of the green color of the pitch for an initial system calibration. The computation of the dominant color is based on a conventional clustering algorithm (k-means type). It can be done automatically on a subset of images extracted from the start of the video or from a reference image supplied by a user (this image will be a long shot image of the pitch). Once the color of the pitch has been characterized, a distance measurement between the dominant color of each shot and the color of the pitch is chosen. This distance can be a simple Euclidian distance in the chosen color space or a more complex distance taking into account the number of occurrences of this color in the shot. Patent application WO 03/03203 filed by the applicant and published on May 13, 2004 describes a method of computing such a distance.

The average activity in the shot is the average of the norm of the movement vectors between images in the shot. These vectors can be obtained directly from the MPEG streams or recomputed in the case of video in another format. The distance model between the activities of two shots can be taken as being the absolute difference value.

The movement of the camera can also be estimated from the MPEG movement vectors or from recomputed vectors. A very simple, simplified linear type movement model with three parameters is sufficient. These three parameters characterize the horizontal and vertical motions and the zoom. The movement model is estimated robustly, that is by taking account only of the pixels associated with the dominant movement. Patent application WO 02/04316 filed by the applicant and published on Jun. 20, 2003 describes a computation method based on the least mean of squares. The distance between the camera movements of two shots can, for example, be taken as a Euclidian distance between the two models with three parameters, this distance possibly being weighted by the ratio between the numbers of pixels associated with the dominant movement in each shot.

There then follows a classification step consisting in separating the long shots from the close-up shots and other shots. For this, the three aforementioned characteristic attributes are extracted for each shot considered and an overall distance measurement is used. This overall distance measurement will be taken, for example, as the weighted sum of the three distances described previously. Two classification methods can be used, these two methods being applied to two different contexts:
- a posteriori classification of the shots,
- on-line classification of shots for direct transmission of the shots.

The a posteriori classification of the shots can be performed entirely automatically. It consists in separating all of the shots into three subgroups (long shots, close-up shots and other shots), all of the shots and their characteristics being known. A three-class k-means type method can be used here. This method is best in terms of result but its applicability is, however, limited in the context of direct transmission with which we are concerned. The flow diagram of FIG. 10 is also partly described in the aforementioned patent application WO 02/04316.

A second method, this time semi-automatic, can also be proposed. It consists firstly in selecting an example of long shot and close-up shot at the start of the video. All the characteristics of these reference shots are then computed.

The classification can then be performed on line by computing the distance between the current shot and these reference shots, then by comparing this difference with a predetermined threshold value in order to obtain a classification in long shots/close-up shots or other shots according to the following algorithm:

If only the difference between the current shot and the long shot is less than the threshold, then the current shot is a long shot.

If only the difference between the current shot and the close-up shot is less than the threshold, then the current shot is a close-up shot.

If the two differences are less than the threshold, then the smaller difference indicates the classification of the shot.

Otherwise the shot is another shot.

For an optimal result, the attributes must be computed from all the images of the shot. The drawback of this computation method lies in the fact that a variable delay is introduced, the delay corresponding to the duration of the current shot. An alternative, non-optimal implementation can, however be used. In this case, only the first N images of the shot are considered. The implicit assumption here involves assuming that the three characteristics of the shot are stable over a given shot.

It is also possible to take into account any changes of the reference characteristics by recomputing the reference characteristics after each shots classification. For example, if a shot is classified as long, the characteristics of the long shot will be recomputed as the average of the characteristics of the preceding long shots and the new long shot.

The exemplary embodiments of the invention described above have been chosen for their concrete nature. It would not, however, be possible to list all the possible embodiments of this invention. In particular, any step or any means described can be replaced by an equivalent step or means without departing from the framework of the present invention.

The invention claimed is:

1. Method of viewing an audiovisual document received by a display device, comprising:
    displaying at normal size the sequences of images of said document on said display device;
    receiving in the display device an attribute indicating that a sequence of images is a long shot; and
    responsive to receiving in the display device said attribute indicating that a sequence of images is a long shot, determining an area of the images of the long shot sequence according to the presence of predetermined objects contained in the image of the long shot sequence and enlarging said image area during a time band such that said area is displayed at a larger size than said normal size.

2. The method of viewing according to claim 1, wherein geometric characteristics of the area are determined during said determination operation.

3. The method of viewing according to claim 1, wherein an enlargement ratio of the area, according to the characteristics of the display device, is determined during said determination operation.

4. The method of viewing according to claim 1, wherein a user entered enlargement ratio is used for enlarging said image area.

5. The method of viewing according to claim 1, wherein
    said determining an area to be enlarged is repeated during time bands when said document is played back; and
    during such time bands when said document is being played back, the enlargement operation is defined according to the duly determined area.

6. The method of viewing according to claim 1, wherein the enlargement operation concerns only a part of said image appearing on the screen, where the enlargement is performed with a magnifying-glass enlarging effect.

7. The method of claim 1, wherein said long shot and said time band are determined in view of attribute information that is part of said received audiovisual document which identifies the time band for said long shot.

8. A device for viewing received audiovisual documents comprising:
    a display means for viewing at a normal size the sequences of images of said document on a screen;
    a means of receiving an attribute indicating that a sequence of images is a long shot; and
    a means for, responsive to receiving at the device for viewing said attribute indicating that a sequence of images is a long shot, determining an area of the images of long shot sequence according to the presence of predetermined objects contained in the images of the long shot sequence and enlarging said area in a larger size than normally displayed during a time band.

9. A viewing device according to claim 8, wherein the means for determining defines geometric characteristics of the at least one area to be enlarged.

10. A viewing device according to claim 8, wherein the means for determining defines an enlargement ratio of said at least one area according to characteristics of said display means.

11. A viewing device according to claim 8, additionally comprising a means for entering an enlargement value, and wherein said means for determining takes into account the enlargement value entered in for determining said at least one image area to be enlarged.

12. A viewing device according to claim 8, wherein the means for determining is activated at regular intervals.

13. A viewing device according to claim 8, wherein said received audiovisual document is made up of sequences; and
    said means for determining is activated on changes of sequences.

14. A viewing device according to claim 8, wherein the display means enlarges said at least one area determined in a portion of the screen in order to show said area with a magnifying-glass enlargement effect.

15. An apparatus to view an audiovisual document received by a display device, comprising:
    a display;
    a processor;
    a memory containing a set of instructions, the set of instructions when executed by the processor performs the operations comprising:
    displaying at normal size the sequences of images of said document on said display device;
    receiving in the display device an attribute indicating that a sequence of images is a long shot; and
    responsive to receiving in the display device said attribute indicating that a sequence of images is a long shot, determining an area of the images of the long shot sequence according to the presence of predetermined objects contained in the image of the long shot sequence, and enlarging said image area during a time band such that said area is displayed at a larger size than said normal size.

16. The apparatus according to claim 15, wherein geometric characteristics of the area are determined during said determination operation.

17. The apparatus according to claim 15, wherein an enlargement ratio of the area, according to the characteristics of the display device, is determined during said determination operation.

18. The apparatus according to claim 15, wherein a user entered enlargement ratio is used for enlarging said image area.

19. The apparatus according to claim 15, wherein
    said determining an area to be enlarged is repeated during time bands when said document is played back; and
    during such time bands when said document is being played back, the enlargement operation is defined according to the duly determined area.

20. The apparatus according to claim 15, wherein the enlargement operation concerns only a part of said image appearing on the screen, where the enlargement is performed with a magnifying-glass enlarging effect.

21. The apparatus according to claim 15, wherein said long shot and said time band are determined in view of attribute information that is part of said received audiovisual document which identifies the time band for said long shot.

* * * * *